United States Patent
Matsumoto et al.

(10) Patent No.: US 8,643,978 B1
(45) Date of Patent: Feb. 4, 2014

(54) SPINDLE MOTOR AND DISK DRIVE APPARATUS

(71) Applicant: Nidec Corporation, Kyoto (JP)

(72) Inventors: Takuro Matsumoto, Kyoto (JP); Atsushi Yawata, Kyoto (JP); Toshihiro Akiyama, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/792,448

(22) Filed: Mar. 11, 2013

Related U.S. Application Data

(60) Provisional application No. 61/724,643, filed on Nov. 9, 2012.

(30) Foreign Application Priority Data

Nov. 8, 2012 (JP) ................................ 2012-246130

(51) Int. Cl.
 *G11B 33/12* (2006.01)
 *H02K 5/22* (2006.01)
(52) U.S. Cl.
 USPC .......................................... 360/99.08; 310/90
(58) Field of Classification Search
 USPC ................................ 360/99.08; 310/90, 67 R
 See application file for complete search history.

(56) References Cited

U.S. PATENT DOCUMENTS

| | | | |
|---|---|---|---|
| 7,012,191 B1 | 3/2006 | Watanabe et al. | |
| 8,120,872 B2 | 2/2012 | Sekii et al. | |
| 8,164,851 B2 * | 4/2012 | Yoneda et al. | 360/99.08 |
| 8,304,945 B2 * | 11/2012 | Yawata et al. | 310/71 |
| 8,324,771 B2 * | 12/2012 | Yawata et al. | 310/71 |
| 8,358,483 B2 * | 1/2013 | Sekii et al. | 360/99.08 |
| 8,363,352 B2 | 1/2013 | Kang | |
| 8,363,353 B2 * | 1/2013 | Yawata | 360/99.08 |
| 2005/0206255 A1 * | 9/2005 | Yoshino et al. | 310/71 |
| 2006/0138886 A1 | 6/2006 | Ito et al. | |
| 2006/0265871 A1 | 11/2006 | Ito et al. | |
| 2007/0247010 A1 | 10/2007 | Ichizaki | |
| 2007/0278880 A1 | 12/2007 | Wada et al. | |

(Continued)

FOREIGN PATENT DOCUMENTS

| | | |
|---|---|---|
| JP | 05-207717 A | 8/1993 |
| JP | 05-070184 U | 9/1993 |

(Continued)

OTHER PUBLICATIONS

Sekii et al., "Motor and Disk Drive Apparatus", U.S. Appl. No. 13/564,934, filed Aug. 2, 2012.

(Continued)

*Primary Examiner* — Angel Castro
(74) *Attorney, Agent, or Firm* — Keating & Bennett, LLP

(57) ABSTRACT

A spindle motor and a disk drive apparatus include a base member, an armature positioned above the base member, and a circuit substrate electrically connected to coils of the armature. The base member includes a bottom portion positioned below the armature and a lower slant surface extending radially outward and upward from an outer peripheral portion of a lower surface of the bottom portion. The circuit substrate includes a plurality of land portions arranged on its lower surface. The lower slant surface includes a first slant surface and a second slant surface arranged along a circumferential direction. At least one land portion is respectively arranged on each of the first slant surface and the second slant surface.

19 Claims, 16 Drawing Sheets

(56) References Cited

U.S. PATENT DOCUMENTS

| | | |
|---|---|---|
| 2008/0019038 A1 | 1/2008 | Xu et al. |
| 2008/0084142 A1 | 4/2008 | Ino et al. |
| 2010/0177627 A1 | 7/2010 | Ino et al. |
| 2012/0200957 A1 | 8/2012 | Yawata |

FOREIGN PATENT DOCUMENTS

| | | |
|---|---|---|
| JP | 05-316704 A | 11/1993 |
| JP | 06-343242 A | 12/1994 |
| JP | 08-033253 A | 2/1996 |
| JP | 08-237899 A | 9/1996 |
| JP | 08-275439 A | 10/1996 |
| JP | 10-108424 A | 4/1998 |
| JP | 2003-153481 A | 5/2003 |
| JP | 2005-253239 A | 9/2005 |
| JP | 2007-295666 A | 11/2007 |
| JP | 2008-005588 A | 1/2008 |
| JP | 2008-092714 A | 4/2008 |
| JP | 2009-110611 A | 5/2009 |
| JP | 2011-114892 A | 6/2011 |
| JP | 2012-005339 A | 1/2012 |

OTHER PUBLICATIONS

Saeki et al., "Spindle Motor and Disk Drive Apparatus", U.S. Appl. No. 13/767,228, filed Feb. 14, 2013.

Saeki et al.,"Base Unit", U.S. Appl. No. 13/770,374, filed Feb. 19, 2013.

Fujinawa et al., "Base Member, Motor, and Disk Drive Apparatus", U.S. Appl. No. 13/770,395, filed Feb. 19, 2013.

Matsumoto et al., "Base Unit, Motor and Disk Drive Apparatus", U.S. Appl. No. 13/770,355, filed Feb. 19, 2013.

Saeki et al., "Stopper, Motor, and Disk Drive Apparatus", U.S. Appl. No. 13/767,194, filed Feb. 14, 2013.

Masumi et al., "Base Plate, Base Unit, Motor, Disk Drive Apparatus and Method of Manufacturing the Base Plate", U.S. Appl. No. 13/789,974, filed Mar. 8, 2013.

Tatsumi et al., "Base Plate, Base Unit, Motor and Disk Drive Apparatus", U.S. Appl. No. 13/788,140, filed Mar. 7, 2013.

Shiraishi et al., "Motor and Disk Drive Apparatus", U.S. Appl. No. 13/783,733, filed Mar. 4, 2013.

Sato et al., "Spindle Motor and Disk Drive Apparatus", U.S. Appl. No. 13/780,447, filed Feb. 28, 2013.

Tamaoka et al., "Motor and Disk Drive Apparatus", U.S. Appl. No. 13/564,900, filed Aug. 2, 2012.

Matsumoto et al., "Spindle Motor and Disk Drive Apparatus", U.S. Appl. No. 13/792,400, filed Mar. 11, 2013.

Matsumoto et al., "Base Unit, Motor and Disk Drive Apparatus", U.S. Appl. No. 13/785,194, filed Mar. 5, 2013.

Matsumoto et al.,"Spindle Motor and Disk Drive Apparatus", U.S. Appl. No. 13/798,842, filed Mar. 13, 2013.

Sato et al., "Spindle Motor and Disk Drive Apparatus", U.S. Appl. No. 13/798,827, filed Mar. 13, 2013.

Ishino et al., "Motor and Disk Drive Apparatus", U.S. Appl. No. 13/794,864, filed Mar. 12, 2013.

\* cited by examiner

SPINDLE MOTOR AND DISK DRIVE APPARATUS

BACKGROUND OF THE INVENTION

1. Field of the Invention

The present invention relates to a spindle motor and a disk drive apparatus.

2. Description of the Related Art

A hard disk device or an optical disk device is equipped with a spindle motor for rotating a disk. The spindle motor includes a stationary unit fixed to a housing of the device and a rotary unit rotating together with a disk supported thereon. In the spindle motor, torque acting about a center axis is generated by magnetic flux generated between the stationary unit and the rotary unit, whereby the rotary unit is rotated with respect to the stationary unit.

A conventional spindle motor is disclosed in, e.g., Japanese Patent Application Publication No. 2011-114892. The spindle motor of Japanese Patent Application Publication No. 2011-114892 includes a base member, coils, and a circuit substrate. Lead wires extending from the coils are led out via through-holes of the base member and are connected to the circuit substrate by solders (see claim 1 and paragraph [0027] of Japanese Patent Application Publication No. 2011-114892).

In the spindle motor disclosed in Japanese Patent Application Publication No. 2011-114892, the solder portions of the circuit substrate are arranged along a wall portion extending obliquely upward from a bottom portion of the base member, thereby reducing the axial thickness of the spindle motor (see paragraphs [0022] and [0027] and FIGS. 4 and 6 of Japanese Patent Application Publication No. 2011-114892).

In the spindle motor of Japanese Patent Application Publication No. 2011-114892, if the solder portions to be soldered are arranged adjacent to each other, there is a likelihood that solders may contact with each other. In contrast, if the distance between the solder portions is merely increased to a great extent, the ease of a soldering work becomes poor. Accordingly, there is a demand for a structure capable of preventing solders from contacting each other without impairing the ease of a soldering work.

SUMMARY OF THE INVENTION

A spindle motor according to one illustrative preferred embodiment of the present invention includes a stationary unit and a rotary unit. The rotary unit is supported to rotate about a center axis extending up-and-down. The stationary unit includes a base member, an armature, and a circuit substrate. The armature is positioned above the base member. The circuit substrate is arranged on a lower surface of the base member and is electrically connected to coils of the armature. The rotary unit includes a magnet arranged to generate torque between the magnet and the armature. The base member includes an upper surface, a bottom portion, base through-holes, and a lower slant surface. The bottom portion is positioned below the armature and has an annular or substantially annular shape. The base through-holes axially extend through the bottom portion. The lower slant surface extends radially outward and upward from an outer peripheral portion of a lower surface of the bottom portion. The circuit substrate includes a plurality of land portions arranged on a lower surface of the circuit substrate. A plurality of lead wires extending from the coils is led out toward the lower surface of the circuit substrate through the base through-holes and is soldered to the plurality of land portions. The lower slant surface includes a first slant surface and a second slant surface arranged along a circumferential direction. At least one of the plurality of land portions is arranged on each of the first slant surface and the second slant surface. A first straight line extends along an inclination direction of the first slant surface. A second straight line extends along an inclination direction of the second slant surface. The first straight line and the second straight line extend away from each other in the circumferential direction as the first straight line and the second straight line extend radially outward.

According to one illustrative preferred embodiment of the present invention, as compared with a case where the inclination directions of the slant surfaces to be soldered are identical with each other, it becomes possible to prevent individual solder portions from contacting other solder portions without impairing the ease of a soldering work.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. In the following description, the direction parallel to the center axis of a spindle motor will be referred to as "axial". The direction orthogonal to the center axis of the spindle motor will be referred to as "radial". The direction extending along a circular arc about the center axis of the spindle motor will be referred to as "circumferential". In the subject application, the shape and positional relationship of individual components will be described under the assumption that the axial direction is an up-and-down direction and further that the side of an armature with respect to a base member is an upper side. However, such definition of the up-and-down direction is not intended to limit the in-use orientation of the spindle motor and the disk drive apparatus according to the present invention.

In this description, the term "parallel" includes both the term "parallel" and the term "substantially parallel" and the term "orthogonal" includes both the term "orthogonal" and the term "substantially orthogonal".

Figure 1:
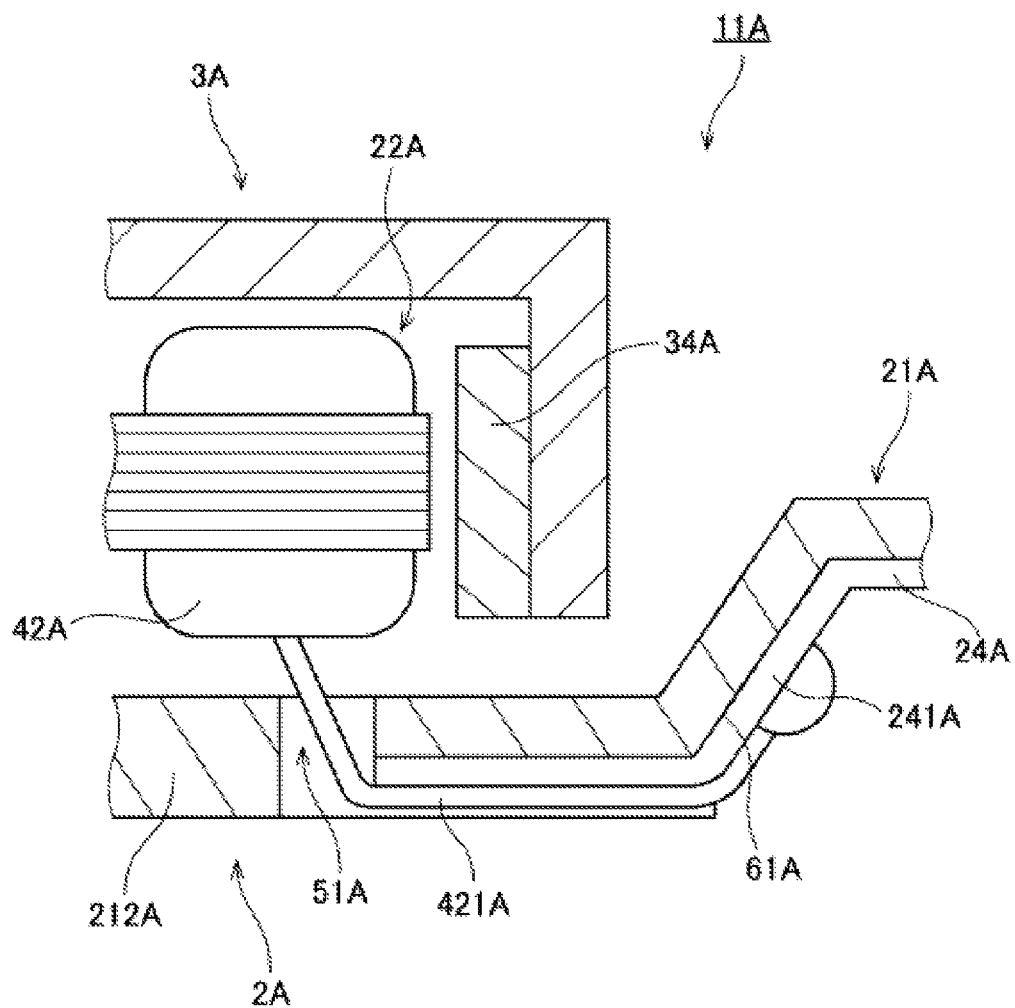
FIG. 1 is a partial vertical-sectional view of a spindle motor according to a first preferred embodiment of the present invention.
Figure 2:
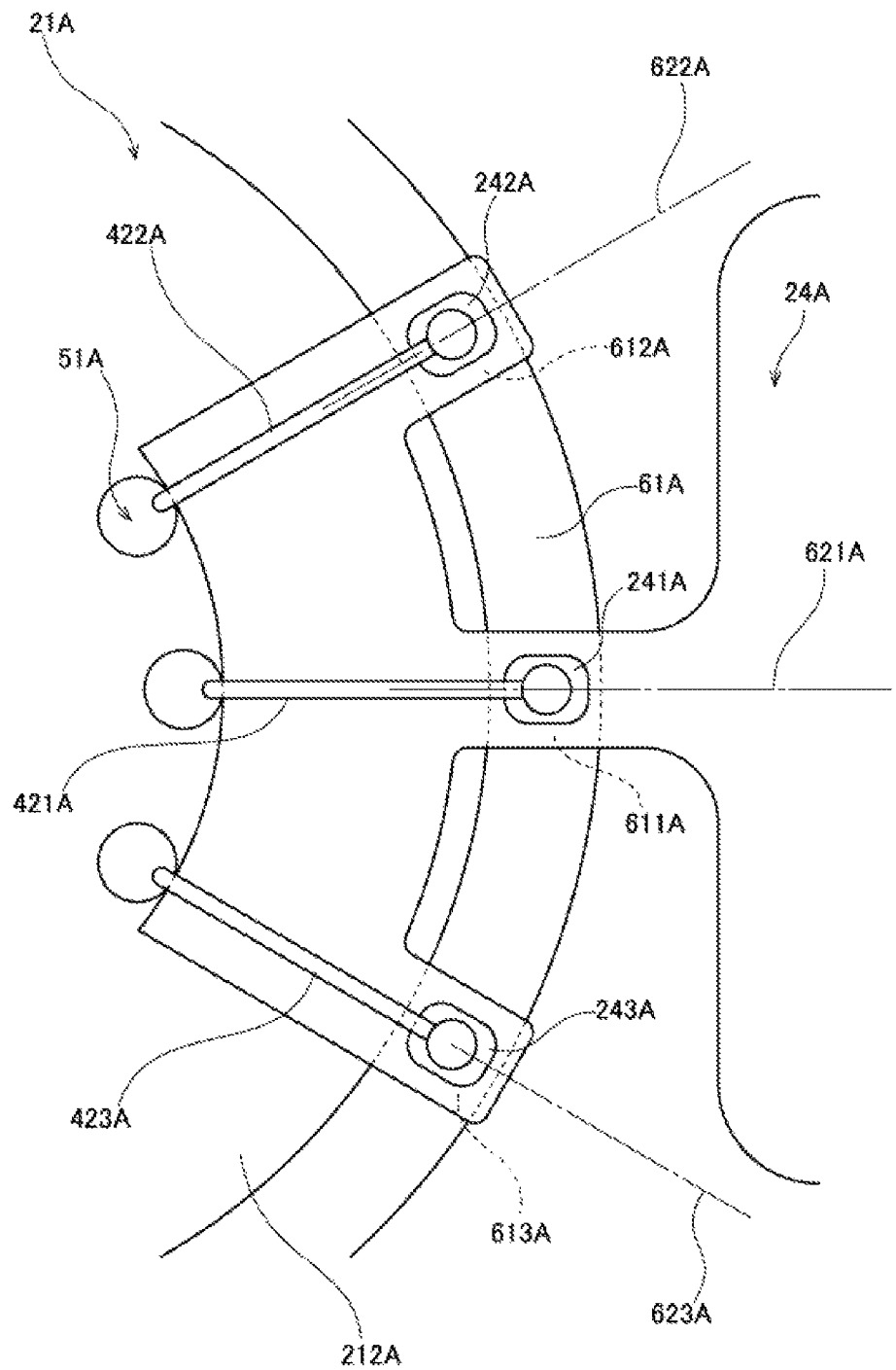
FIG. 2 is a partial bottom view of the spindle motor according to the first preferred embodiment of the present invention.

FIG. 1 is a partial vertical-sectional view of a spindle motor 11A according to a first preferred embodiment of the present invention. FIG. 2 is a partial bottom view of the spindle motor 11A shown in FIG. 1. As shown in FIG. 1, the spindle motor 11A preferably includes a stationary unit 2A and a rotary unit 3A.

The stationary unit 2A preferably includes a base member 21A, an armature 22A, and a circuit substrate 24A. The base member 21A is preferably made of metal such as, e.g., aluminum, aluminum alloy, ferromagnetic or non-magnetic stainless steel, magnesium alloy, etc. The armature 22A preferably includes a plurality of coils 42A and is positioned above the base member 21A. The circuit substrate 24A is arranged on the lower surface of the base member 21A. The circuit substrate 24A is electrically connected to the coils 42A of the armature 22A.

The rotary unit 3A is supported to rotate about a center axis extending up-and-down. The rotary unit 3A preferably includes a magnet 34A. During the operation of the spindle motor 11A, torque is generated by the magnetic flux generated between the armature 22A and the magnet 34A.

As shown in FIGS. 1 and 2, the base member 21A preferably includes a bottom portion 212A, base through-holes 51A, and a lower slant surface 61A. The bottom portion 212A is positioned below the armature 22A and extends in an annular or a substantially annular shape. The base through-holes 51A axially extend through the bottom portion 212A. The lower slant surface 61A widens radially outward and upward from an outer peripheral portion of a lower surface of the bottom portion 212A.

As shown in FIG. 2, the circuit substrate 24A preferably includes three land portions 241A, 242A, and 243A arranged on the lower surface thereof. Three lead wires 421A, 422A, and 423A extending from the coils 42A are led out toward the lower surface of the circuit substrate 24A through the respective base through-holes 51A and are respectively soldered to the land portions 241A, 242A, and 243A. In the present preferred embodiment, the base through-holes 51A are preferably provided in a one-to-one relationship with the lead wires 421A, 422A, and 423A. Alternatively, a plurality of lead wires may be led out through a single base through-hole if so desired.

The lower slant surface 61A preferably includes a first slant surface 611A, a second slant surface 612A, and a third slant surface 613A which are arranged along the circumferential direction. The three land portions 241A, 242A, and 243A are respectively arranged on the first slant surface 611A, the second slant surface 612A, and the third slant surface 613A. In the present preferred embodiment, the land portions 241A, 242A, and 243A are preferably arranged in a one-to-one relationship with the three slant surfaces 611A, 612A, and 613A. However, at least one land portion may be arranged on each of at least two slant surfaces.

In the spindle motor 11A, a first straight line 621A extending along an inclination direction of the first slant surface 611A and a second straight line 622A extending along an inclination direction of the second slant surface 612A extend away from each other in the circumferential direction as they extend radially outward. Similarly, the first straight line 621A extending along the inclination direction of the first slant surface 611A and a third straight line 623A extending along an inclination direction of the third slant surface 613A extend away from each other in the circumferential direction as they extend radially outward. In this case, as compared with a case where the inclination directions of the slant surfaces adjoining in the circumferential direction are identical with each other, it becomes possible to prevent individual solder portions from contacting other solder portions without impairing the ease of a soldering work.

Figure 3:
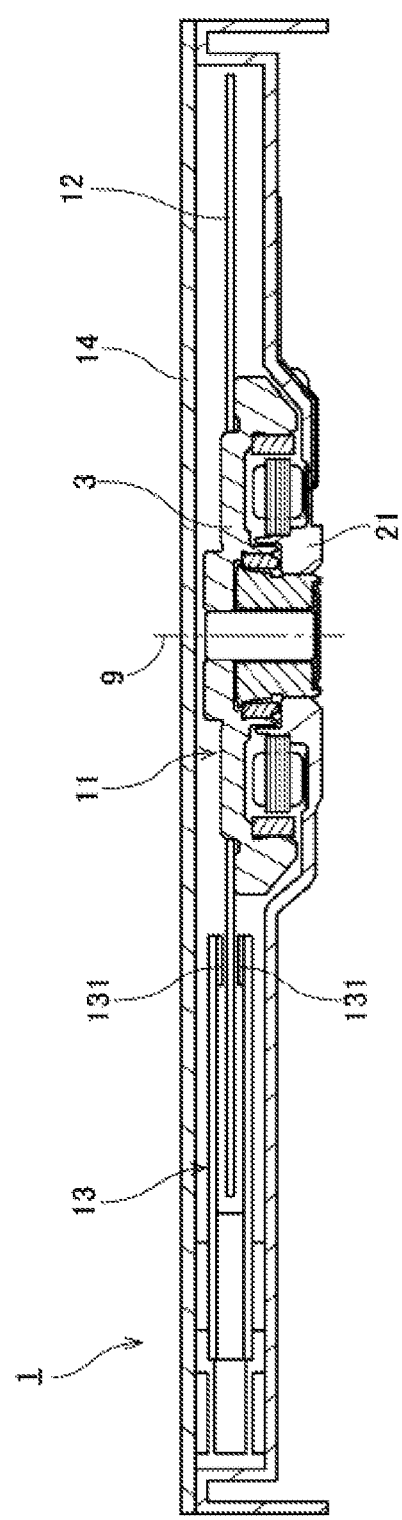
FIG. 3 is a vertical-sectional view of a disk drive apparatus according to a second preferred embodiment of the present invention.

FIG. 3 is a vertical-sectional view of a disk drive apparatus according to a second preferred embodiment of the present invention. The disk drive apparatus 1 is an apparatus arranged to rotate, e.g., a magnetic disk 12, and to perform information reading and writing tasks with respect to the magnetic disk 12. As shown in FIG. 3, the disk drive apparatus 1 preferably includes a spindle motor 11, a magnetic disk 12, an access unit 13, and a cover 14.

The spindle motor 11 supports the magnetic disk 12 and rotates the magnetic disk 12 about a center axis 9. The spindle motor 11 preferably includes a base member 21 extending and widening in a direction orthogonal to the center axis 9. The upper region of the base member 21 is covered with the cover 14. A rotary unit 3 included in the spindle motor 11, the magnetic disk 12 and the access unit 13 are accommodated within a housing including the base member 21 and the cover 14. The access unit 13 moves a head 131 along the recording surface of the magnetic disk 12 and performs information reading and writing tasks with respect to the magnetic disk 12.

The disk drive apparatus 1 may alternatively include two or more magnetic disks 12 if so desired. Furthermore, the access unit 13 may perform either one of the information reading or writing task with respect to the magnetic disk 12.

Figure 4:
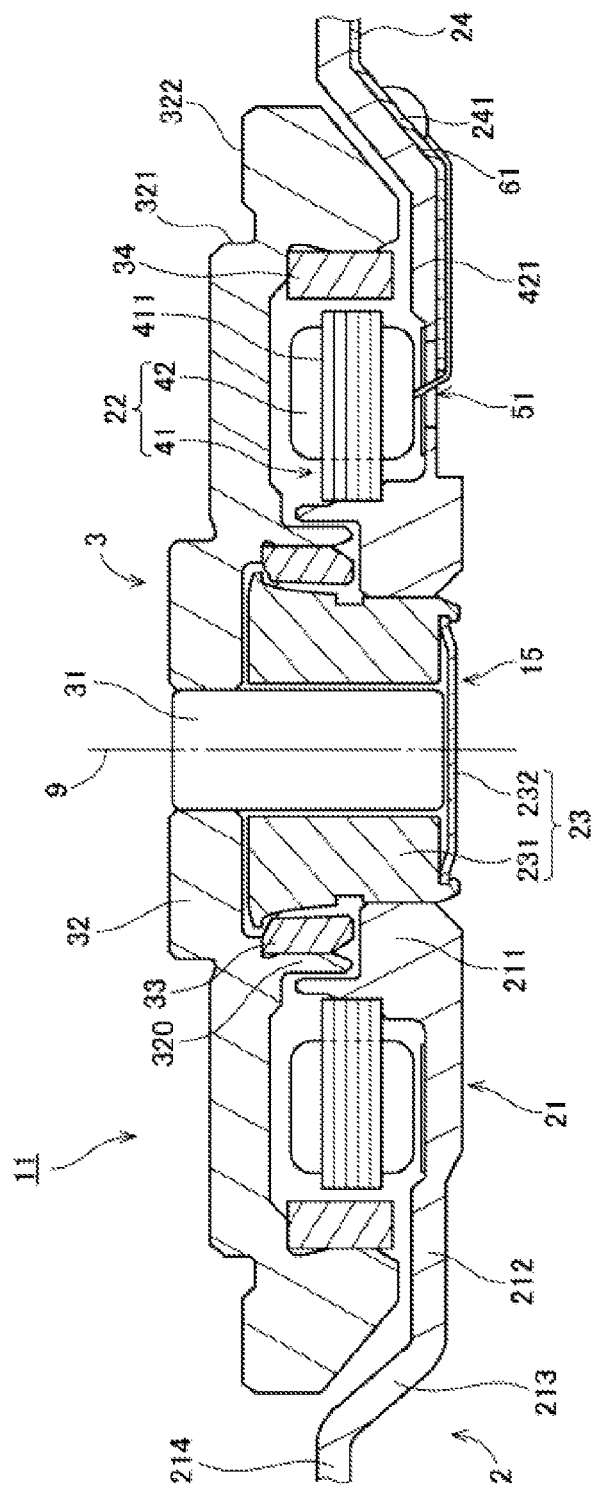
FIG. 4 is a vertical-sectional view of a spindle motor according to the second preferred embodiment of the present invention.
Figure 5:
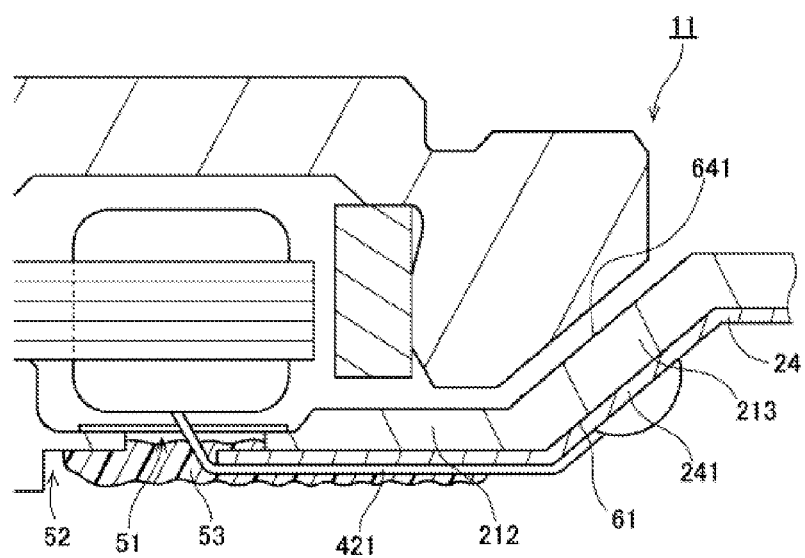
FIG. 5 is a partial vertical-sectional view of the spindle motor according to the second preferred embodiment of the present invention.

Next, description will be made of the detailed configuration of the spindle motor 11 according to a preferred embodiment of the present invention. FIG. 4 is a vertical-sectional view of the spindle motor 11. FIG. 5 is a partial vertical-sectional view of the spindle motor 11.

As shown in FIG. 4, the spindle motor 11 preferably includes a stationary unit 2 and the rotary unit 3. The stationary unit 2 is kept stationary with respect to the base member 21. The rotary unit 3 is supported to rotate with respect to the stationary unit 2. The spindle motor 11 is preferably a three-phase brushless motor, but may be any other desirable kind of motor.

The stationary unit 2 of the present preferred embodiment preferably includes a base member 21, an armature 22, a stationary bearing unit 23, and a circuit substrate 24.

The base member 21 is arranged below the rotary unit 3 to extend in a direction orthogonal to the center axis 9. The base member 21 can preferably be produced by, e.g., pressing a metal plate. Alternatively, the base member 21 may be formed by other methods such as, for example, casting, cutting, etc. For example, the base member 21 may be formed by casting aluminum, an aluminum alloy, a magnesium alloy, etc. The surface of the base member 21 may be subjected to metal plating or electrophoretic coating. The base member 21 may include a plurality of elements or component parts.

The base member 21 preferably includes a cylinder portion 211, an inner bottom portion 212, an annular wall portion 213, and an outer bottom portion 214. The inner bottom portion 212 is arranged below the armature 22 to extend in an annular or a substantially annular shape. Moreover, the inner bottom portion 212 is positioned more downward than the outer bottom portion 214. The cylinder portion 211 extends upward in a cylindrical or substantially cylindrical shape from the radial inner edge portion of the inner bottom portion 212. The annular wall portion 213 extends radially outward and upward from the radial outer edge portion of the inner bottom portion 212. The outer bottom portion 214 further extends radially outward from the radial outer edge portion of the annular wall portion 213.

The armature 22 and a portion of the rotary unit 3 are accommodated at the upper side of the inner bottom portion 212 and at the radial inner side of the annular wall portion 213.

Base through-holes 51 are preferably defined in the inner bottom portion 212. The base through-holes 51 axially extend through the inner bottom portion 212. In the present preferred embodiment, the number of the base through-holes 51 is preferably three, for example, which is equal to the number of lead wires, to be described later.

The annular wall portion 213 preferably includes a lower slant surface 61. The lower slant surface 61 is a lower surface of the annular wall portion 213. The lower slant surface 61 extends radially outward and upward from an outer peripheral portion of a lower surface of the inner bottom portion 212. The lower slant surface 61 is joined to an inner peripheral portion of a lower surface of the outer bottom portion 214.

The armature 22 preferably includes a stator core 41 and a plurality of coils 42. The stator core 41 and the coils 42 are positioned above the inner bottom portion 212. The stator core 41 is defined by a laminated steel member obtained by axially stacking electromagnetic steel plates one above another, the electromagnetic steel plates preferably being, e.g., silicon steel plates. The stator core 41 is fixed to the outer circumferential surface of the cylinder portion 211. Moreover, the stator core 41 preferably includes a plurality of teeth 411 protruding radially outward. The teeth 411 are preferably arranged at a regular or a substantially regular interval in the circumferential direction.

Figure 6:
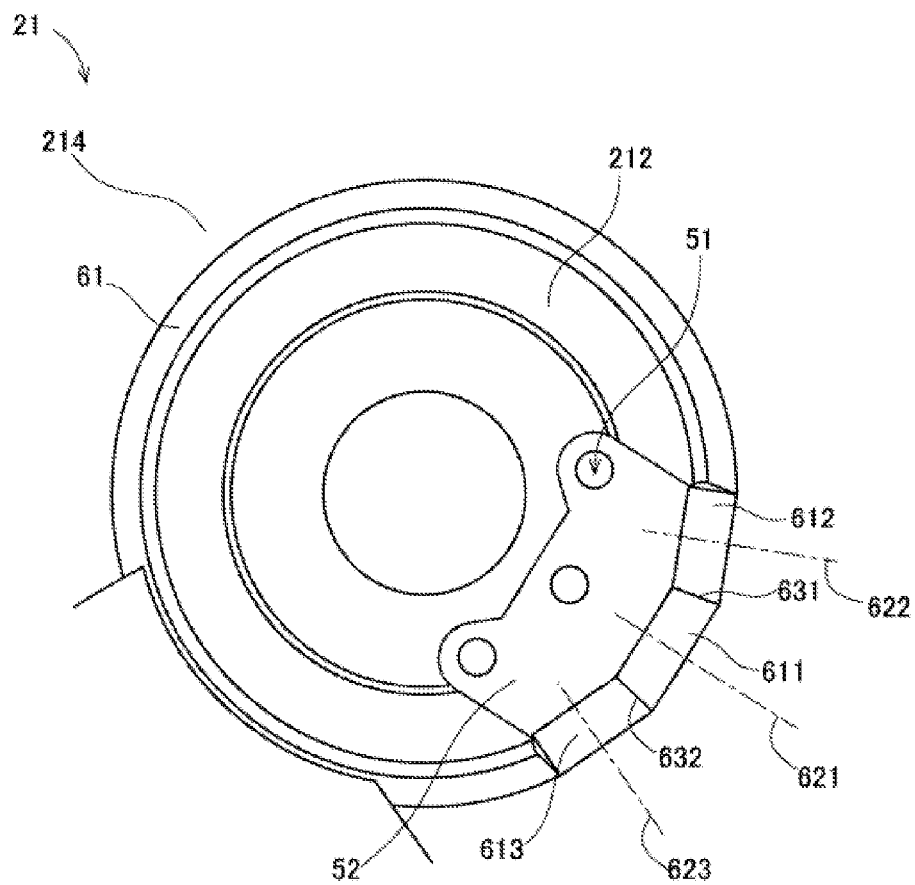
FIG. 6 is a partial bottom view of a base member according to the second preferred embodiment of the present invention.
Figure 7:
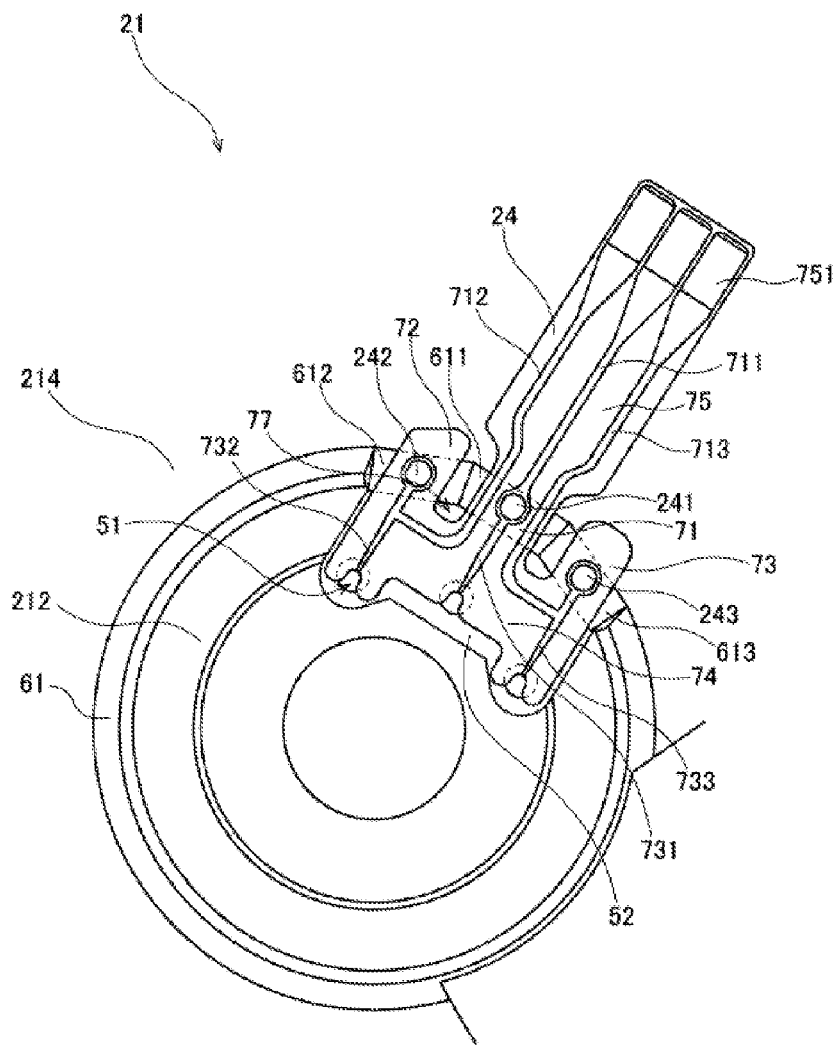
FIG. 7 is a partial bottom view of the base member and a circuit substrate according to the second preferred embodiment of the present invention.
Figure 8:
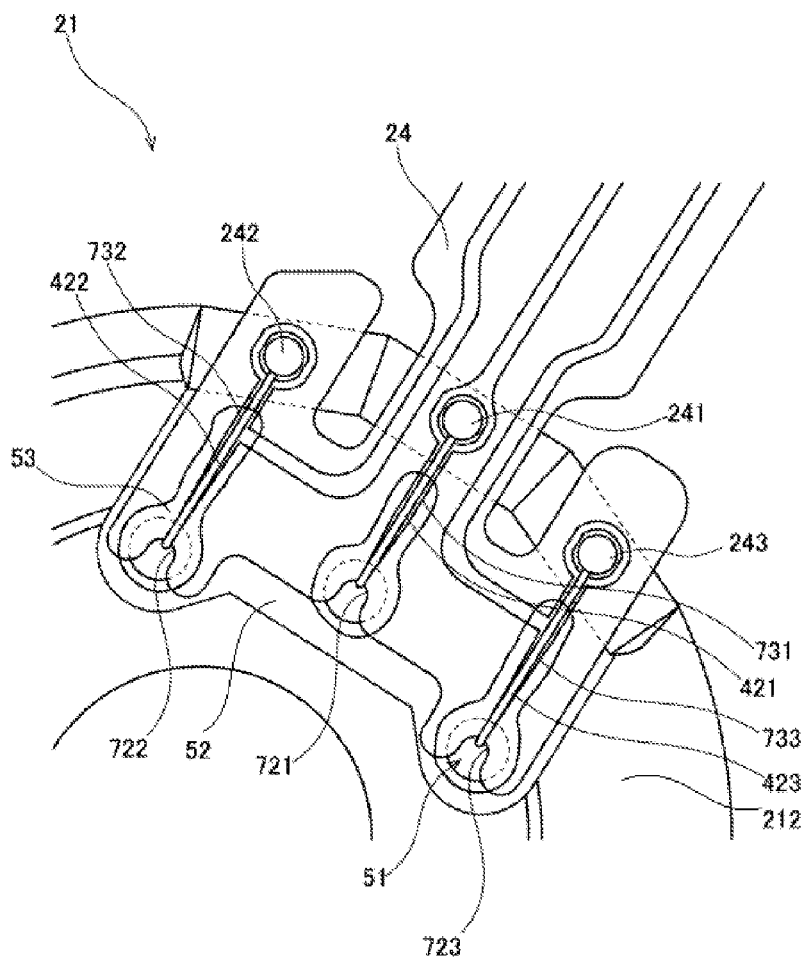
FIG. 8 is a partial bottom view of the base member, the circuit substrate and lead wires according to the second preferred embodiment of the present invention.

The coils 42 are defined by lead wires wound around the respective teeth 411. The coils 42 of the present preferred embodiment are preferably defined by three lead wires 421, 422, and 423 (not shown) which supply three-phase currents therethrough. As shown in FIGS. 6, 7, and 8, the end portions of the three lead wires 421, 422, and 423 are respectively led out toward the lower surface of the base member 21 via the three base through-holes 51 defined in the inner bottom portion 212.

FIG. 6 is a partial bottom view of the base member 21. FIG. 7 is a partial bottom view of the base member 21 and the circuit substrate 24. FIG. 8 is a partial bottom view of the base member 21, the circuit substrate 24, and the three lead wires 421, 422, and 423. As shown in FIGS. 6, 7, and 8, a groove 52 is partially defined on the lower surface of the inner bottom portion 212 of the base member 21. As shown in FIGS. 7 and 8, the circuit substrate 24 is arranged in the groove 52 defined on the lower surface of the base member 21. The groove 52 is preferably formed by, e.g., cutting the base member 21 which has been subjected to, for example, press working. It is noted that, if the groove 52 is formed by cutting, it is possible to form the groove 52 in a higher precision as compared with cases where the groove 52 is formed by other methods such as, for example, press working, casting, etc. Alternatively, the groove 52 may be formed by press working, casting, etc.

As shown in FIG. 8, three land portions 241, 242, and 243 exposing copper foils therethrough are arranged on the lower surface of the circuit substrate 24. The three lead wires 421, 422, and 423 which are led out from the respective base through-holes 51 are soldered to the three land portions 241, 242, and 243, respectively. Thus, the circuit substrate 24 and the coils 42 are electrically connected to each other. An electric current which drives the spindle motor 11 is supplied from an external power source to the coils 42 via the circuit substrate 24.

As shown in FIGS. 5 and 8, an adhesive agent 53 is preferably provided in the base through-holes 51 and the groove 52. The adhesive agent 53 is arranged to seal up the lower openings of the base through-holes 51. This prevents gas from flowing through the base through-holes 51. As a result, it is possible to enhance the air-tightness of the disk drive apparatus 1. Additionally, the adhesive agent 53 preferably serves to fix the three lead wires 421, 422, and 423 within the groove 52. Consequently, the three lead wires 421, 422, and 423 are prevented from protruding downward beyond the lower surface of the inner bottom portion 212. The adhesive agent 53 may fill the whole internal spaces of the base through-holes 51. The adhesive agent 53 may cover at least a portion or entire portions of the three lead wires 421, 422, and 423 positioned in the groove 52. Preferably, the adhesive agent 53 continuously exists from the lower openings of the base through-holes 51 to the groove 52.

In the present preferred embodiment, the number of the lead wires 421, 422, and 423 led out from the base through-holes is preferably set equal to three in a corresponding relationship with a U-phase, a V-phase, and a W-phase. However, the number of the lead wires 421, 422, and 423 led out from the base through-holes 51 is not limited to three. For example, four lead wires may be led out from the base through-holes 51 and may be respectively soldered to four land portions. In this case, the four lead wires may preferably include lead wires for a U-phase, a V-phase, a W-phase, and a common lead wire. The common lead wire is preferably defined by twisting three wires into a single wire, so that the twisted wires as a whole can be regarded as a single lead wire. Moreover, the number of the base through-holes 51 is not limited to three. For example, three lead wires may be let out from a single base through-hole. Two lead wires may each be respectively led out from two base through-holes. Four lead wires may be respectively led out from four base through-holes.

A flexible printed substrate is preferably used as the circuit substrate 24 of the present preferred embodiment. Use of the flexible printed substrate makes it possible to arrange the circuit substrate 24 along the unevenness of the lower surface of the base member 21. Use of the flexible printed substrate also makes it possible to reduce the axial thickness of the circuit substrate 24 as compared with other substrates.

As shown in FIG. 4, the stationary bearing unit 23 preferably includes a sleeve 231 and a cap 232. The sleeve 231 axially extends in a cylindrical or substantially cylindrical shape around a shaft 31, to be later described. The lower portion of the sleeve 231 is accommodated radially inward of the cylinder portion 211 of the base member 21 and is preferably fixed to the cylinder portion 211 by, e.g., an adhesive agent. The inner circumferential surface of the sleeve 231 is radially opposed to the outer circumferential surface of the shaft 31. The cap 232 closes the lower opening of the sleeve 231. The sleeve 231 may alternatively include a plurality of elements or component parts if so desired.

As shown in FIG. 4, the rotary unit 3 is supported to rotate about a center axis extending up-and-down. The rotary unit 3 of the present preferred embodiment preferably includes a shaft 31, a hub 32, an annular member 33, and a magnet 34.

The shaft 31 is arranged radially inward of the sleeve 231 to extend in the axial direction. The shaft 31 is preferably made of metal, e.g., ferromagnetic or non-magnetic stainless steel. The upper end portion of the shaft 31 protrudes upward of the upper surface of the sleeve 231.

The hub 32 extends radially outward from the outer circumferential surface of the upper end portion of the shaft 31. The inner peripheral portion of the hub 32 is fixed to the upper end portion of the shaft 31. As shown in FIG. 4, the hub 32 of the present preferred embodiment preferably includes an annular projection 320 protruding downward. The annular member 33 is fixed to the inner circumferential surface of the annular projection 320. The inner circumferential surface of the annular member 33 is radially opposed to the outer circumferential surface of the sleeve 231.

The hub 32 preferably includes a first holding surface 321 having a cylindrical or a substantially cylindrical shape and a second holding surface 322 extending radially outward from the lower end portion of the first holding surface 321. The inner peripheral portion of the magnetic disk 12 contacts at least a portion of the first holding surface 321. Furthermore, the lower surface of the magnetic disk 12 contacts at least a portion of the second holding surface 322. Thus, the magnetic disk 12 is held in place.

A lubricant is provided between the shaft 31 and the stationary bearing unit 23, between the hub 32 and the stationary bearing unit 23, and between the annular member 33 and the stationary bearing unit 23. The liquid level of the lubricant is preferably positioned between the sleeve 231 and the annular member 33. For example, polyol ester-based oil or diester-based oil is preferably used as the lubricant. The shaft 31 is rotatably supported with respect to the stationary bearing unit 23 through the lubricant.

That is to say, in the present preferred embodiment, a bearing mechanism 15 preferably includes the sleeve 231 and the cap 232, which are members belonging to the stationary unit 2; the shaft 31, the hub 32, and the annular member 33, which are members belonging to the rotary unit 3; and the lubricant existing between these members. The bearing mechanism 15 is accommodated within the cylinder portion 211. The rotary unit 3 is supported on the bearing mechanism 15 and is rotated about the center axis 9.

The magnet 34 is arranged radially outward from the armature 22 and is fixed to the hub 32. The magnet 34 of the present preferred embodiment preferably has an annular or substantially annular shape. The inner circumferential surface of the magnet 34 is radially opposed to the radial outer end surfaces of the teeth 411. The inner circumferential surface of the magnet 34 is alternately magnetized with N-poles and S-poles along the circumferential direction.

A plurality of magnets may be used in place of the annular magnet 34 if so desired. In case of using a plurality of magnets, they may be arranged along the circumferential direction so that N-poles and S-poles can be alternately lined up.

In the spindle motor 11 described above, if an electrical drive current is supplied to the coils 42 via the circuit substrate 24, magnetic flux is generated in the teeth 411. Then, circumferential torque is generated by the magnetic flux acting between the teeth 411 and the magnet 34. As a result, the rotary unit 3 is rotated about the center axis 9 with respect to the stationary unit 2. The magnetic disk 12 supported on the hub 32 is rotated about the center axis 9 together with the rotary unit 3.

A detailed description will now be made of the structure and shape of the lower slant surface 61.

As shown in FIG. 6, the lower slant surface 61 preferably includes a first slant surface 611, a second slant surface 612, and a third slant surface 613, which are arranged along the circumferential direction. The first slant surface 611 is positioned between the second slant surface 612 and the third slant surface 613. Each of the first slant surface 611, the second slant surface 612, and the third slant surface 613 is preferably a planar or substantially planar surface. Therefore, when the circuit substrate is arranged along each of the slant surfaces 611, 612, and 613, the circuit substrate is prevented from becoming distorted. This makes it easy to arrange the circuit substrate.

As shown in FIG. 7, the land portions 241, 242, and 243 of the circuit substrate 24 are preferably arranged on the first, second and third slant surfaces 611, 612, and 613, respectively. In the present preferred embodiment, only one land portion is preferably arranged on each of the three slant surfaces, for example. However, at least one land portion may alternatively be arranged on each of at least two slant surfaces. For example, two or more land portions may be arranged on one slant surface.

In the spindle motor 11, as shown in FIG. 6, the direction of the first slant surface 611, the direction of the second slant surface 612, and the direction of the third slant surface 613 all preferably differ from one another. More specifically, a first straight line 621 extending along an inclination direction of the first slant surface 611 and a second straight line 622 extending along an inclination direction of the second slant surface 612 extend away from each other in the circumferential direction as they extend radially outward. Similarly, the first straight line 621 extending along the inclination direction of the first slant surface 611 and a third straight line 623 extending along an inclination direction of the third slant surface 613 extend away from each other in the circumferential direction as they extend radially outward. Accordingly, as compared with a case where the inclination directions of the slant surfaces adjoining in the circumferential direction are identical with each other, the apex portions of solder portions arranged in the respective land portions are farther away from each other. For that reason, it becomes possible to prevent the solder portions from contacting each other without impairing the ease of a soldering work.

On the lower slant surface 61, lower-surface bulging portions 631 and 632 having a convex shape are preferably respectively provided in a border between the first slant surface 611 and the second slant surface 612 and in a border between the first slant surface 611 and the third slant surface 613. Each of the lower-surface bulging portions 631 and 632 is positioned between the adjoining solders. It is therefore preferably possible to more reliably prevent the solder portions from contacting each other in the borders between the adjoining slant surfaces. The apex portions of the lower-surface bulging portions 631 and 632 overlap with at least one of the solder portions in the circumferential direction. The apex portion of the lower-surface bulging portion 631 is preferably positioned more downward than the first slant surface 611 and the second slant surface 612. Likewise, the apex portion of the lower-surface bulging portion 632 is preferably positioned more downward than the first slant surface 611 and the third slant surface 613.

Figure 9:
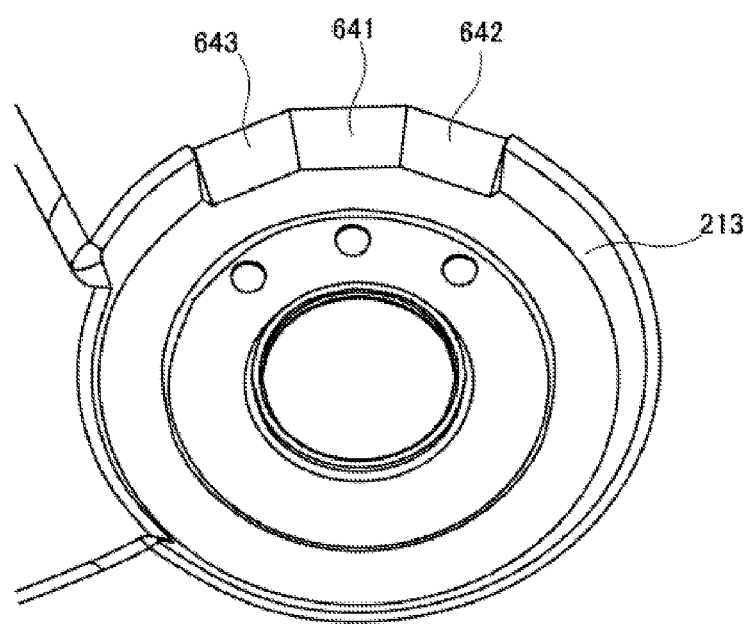
FIG. 9 is a partial perspective view of an upper surface of the base member according to the second preferred embodiment of the present invention.

FIG. 9 is a partial perspective view of the upper surface of the base member 21. As shown in FIGS. 5 and 9, the upper surface of the annular wall portion 213 preferably includes a first upper-surface bulging portion 641 extending parallel to the first slant surface 611. Similarly, the upper surface of the annular wall portion 213 preferably includes a second upper-surface bulging portion 642 extending parallel to the second slant surface 612. Moreover, the upper surface of the annular wall portion 213 preferably includes a third upper-surface bulging portion 643 extending parallel to the third slant surface 613. The slant surfaces 611, 612, and 613 are positioned above the remaining portion of the lower slant surface 61. On the other hand, on the upper surface of the annular wall portion 213, the upper-surface bulging portions 641, 642, and 643 protrude from the remaining portion of the annular wall portion 213. Accordingly, the gap between the respective upper-surface bulging portions 641, 642, and 643 and the rotary unit 3 in the position of the upper surface of the base member 21 corresponding to the lower slant surface 61 is smaller than the gap between the region of the upper surface of the annular wall portion 213 other than the upper-surface bulging portions 641, 642, and 643 and the rotary unit 3. With this shape, the thickness of the annular wall portion 213 becomes constant or substantially constant along the circumferential direction. This makes it possible to maintain the rigidity of the base member.

In the present preferred embodiment, the first slant surface 611, the second slant surface 612, the third slant surface 613, the first upper-surface bulging portion 641, the second upper-surface bulging portion 642, and the third upper-surface bulging portion 643 are preferably formed by, for example, press working. More specifically, an intermediate member obtained by pressing a metal plate is pressed from the lower surface toward the upper surface thereof. Consequently, the lower surface of the intermediate member is depressed and the upper surface of the intermediate member corresponding to the lower surface is bulged. As a result, the first slant surface 611, the second slant surface 612, the third slant surface 613, the first upper-surface bulging portion 641, the second upper-surface bulging portion 642, and the third upper-surface bulging portion 643 are formed. In this manner, it is possible to simultaneously form the slant surfaces 611, 612, and 613 and the upper-surface bulging portions 641, 642, and 643.

Next, the circuit substrate 24 will be described in detail.

The circuit substrate 24 is preferably defined by a plurality of thin film layers axially stacked one above another.

Among the thin film layers, an electrically conductive copper foil layer preferably includes an upper surface covered with an insulating layer. In other words, the upper surface of the copper foil layer does not contact the base member 21. Moreover, the lower surface of the copper foil layer, except electric connection portions such as, for example, land portions and electrodes, is preferably covered with an insulating layer. The uppermost layer of the circuit substrate 24 is preferably a sticky material layer. The circuit substrate 24 is fixed to the base member 21 by the sticky material layer. Alternatively, the sticky material layer may be omitted and the circuit substrate 24 may be fixed to the base member 21 by, for example, an adhesive agent.

As shown in FIG. 7, the circuit substrate 24 preferably includes a first substrate piece 71, a second substrate piece 72, and a third substrate piece 73. The first substrate piece 71, the second substrate piece 72, and the third substrate piece 73 are arranged along the circumferential direction with gaps left therebetween. In other words, gaps 77 exist between the first substrate piece 71 and the second substrate piece 72 and between the first substrate piece 71 and the third substrate piece 73. In the present preferred embodiment, the gaps 77 are preferably defined by cutouts. However, the gaps 77 may be simple incisions or may be a minute clearance such as, for example, a slit or the like. The land portion 241 is arranged in the first substrate piece 71. The land portion 242 is arranged in the second substrate piece 72. The land portion 243 is arranged in the third substrate piece 73. The substrate pieces 71, 72, and 73 are at least partially arranged on the lower slant surface 61. In this case, it is possible to prevent the circuit substrate 24 from being distorted when the circuit substrate 24 is arranged on the lower slant surface 61.

The circuit substrate 24 of the present preferred embodiment preferably includes an inner connecting portion 74 arranged to interconnect the radial inner end portions of the first substrate piece 71, the second substrate piece 72, and the third substrate piece 73. The radial outer end side of the inner connecting portion 74 is arranged on the inner bottom portion 212. In this case, it is possible to further prevent the circuit substrate 24 from being distorted in a border region between the inner bottom portion 212 and the lower slant surface 61.

The outer end portions of the substrate pieces 71, 72, and 73 are arranged on the outer bottom portion 214 arranged radially outward of the lower slant surface 61. Since the substrate pieces 71, 72, and 73 are arranged on the lower slant surface 61 and the outer bottom portion 214 in this manner, the substrate pieces 71, 72, and 73 are hard to peel off.

In the present preferred embodiment, the circumferential width of the substrate pieces 71, 72, and 73 is smaller than the circumferential gap between the adjoining substrate pieces. The land portions 241, 242, and 243 arranged in the substrate pieces 71, 72, and 73 are arranged at a regular or a substantially regular interval along the circumferential direction. This helps enhance the soldering work efficiency.

The circuit substrate 24 preferably includes an outer substrate portion 75 extending radially outward from the first substrate piece 71. The circuit substrate 24 preferably includes a plurality of first copper foils 711, 712, and 713 arranged to electrically interconnect electrodes 751 arranged in the outer substrate portion 75 and the land portions 241, 242, and 243. The first copper foil 711 connected to the land portion 241 arranged in the first substrate piece 71 extends radially outward from the land portion 241 to the electrodes 751 of the outer substrate portion 75. The first copper foils 712 and 713 which are connected to the land portions 242 and 243 are arranged in the second substrate piece 72 and the third substrate piece 73 extend from the land portions 242 and 243 to the electrodes 751 of the outer substrate portion 75 via the inner connecting portion 74 and the first substrate piece 71.

As stated above, in the present preferred embodiment, the radial outer end portions of the substrate pieces 71, 72, and 73 are not connected to one another. Thus, the substrate pieces 71, 72, and 73 can be arranged in arbitrary positions on the lower slant surface 61. It is therefore possible to design the substrate pieces 71, 72, and 73 to have arbitrary shapes. Moreover, since the radial outer end portions of the substrate pieces 71, 72, and 73 are not connected to one another, it is possible to accurately attach the substrate pieces 71, 72, and 73 to the lower slant surface 61. This makes it possible to avoid, e.g., misaligned attachment of the circuit substrate 24 or generation of wrinkles. Accordingly, it is possible to prevent the circuit substrate 24 from peeling off from the base member 21.

As shown in FIG. 8, the circuit substrate 24 preferably includes a plurality of tip edge portions 721, 722, and 723 axially overlapping with the base through-holes 51. The lead wires 421, 422, and 423 extending from the coils 42 contact the tip edge portions 721, 722, and 723. This prevents the lead wires 421, 422, and 423 and the base member 21 from contacting each other.

The circuit substrate 24 preferably includes a plurality of second copper foils 731, 732, and 733 extending from the land portions 241, 242, and 243 toward the base through-holes 51. The radial inner end portions of the second copper foils 731, 732, and 733 are positioned in the tip edge portions 721, 722, and 723, respectively. That is to say, the base through-holes 51 axially overlap with the radial inner end portions of the second copper foils 731, 732, and 733. In other words, the radial inner end portions of the second copper foils 731, 732, and 733 are arranged in the base through-holes 51. This prevents the radial inner end portions of the second copper foils 731, 732, and 733 from contacting the base member 21.

As shown in FIG. 8, the second copper foils 731, 732, and 733 and the lead wires 421, 422, and 423 overlap with each other when seen from below. In other words, the lead wires 421, 422, and 423 extend along the second copper foils 731, 732, and 733, respectively. Thus, the second copper foils 731, 732, and 733 serve as marks. This helps enhance the efficiency of manufacturing step in which the lead wires 421, 422, and 423 are led out from the coils 42 to the land portions 241, 242, and 243. The second copper foils 731, 732, and 733 and the lead wires 421, 422, and 423 may contact with each other.

The second copper foils 731, 732, and 733 extend parallel to one another. The lead wires 421, 422, and 423 extend parallel to one another between the lower end portions of the base through-holes 51 and the land portions 241, 242, and 243. This makes it easy to perform a manufacturing step in which the lead wires 421, 422, and 423 are drawn from the lower end portions of the base through-holes 51 to the land portions 241, 242, and 243. In addition, a worker can perform a soldering work with ease. This enhances the soldering work efficiency. While the lead wires 421, 422, and 423 preferably extend parallel to one another in the present preferred embodiment, they may alternatively extend in a radial or substantially radial pattern as in the first preferred embodiment shown in FIG. 2.

As shown in FIGS. 7 and 8, each of the land portions 241, 242, and 243 of the present preferred embodiment preferably has an elliptical or substantially elliptical shape when seen from below. The major axes of the land portions 241, 242, and 243 are arranged parallel to one another. This makes it possible to increase the distance between the adjoining land portions without having to reduce the areas of the land portions 241, 242, and 243. In other words, it is possible to more reliably prevent the solder portions existing on the adjoining land portions from contacting one another.

While illustrative preferred embodiments of the present invention have been described above, the present invention is not limited to the aforementioned preferred embodiments.

Figure 10:
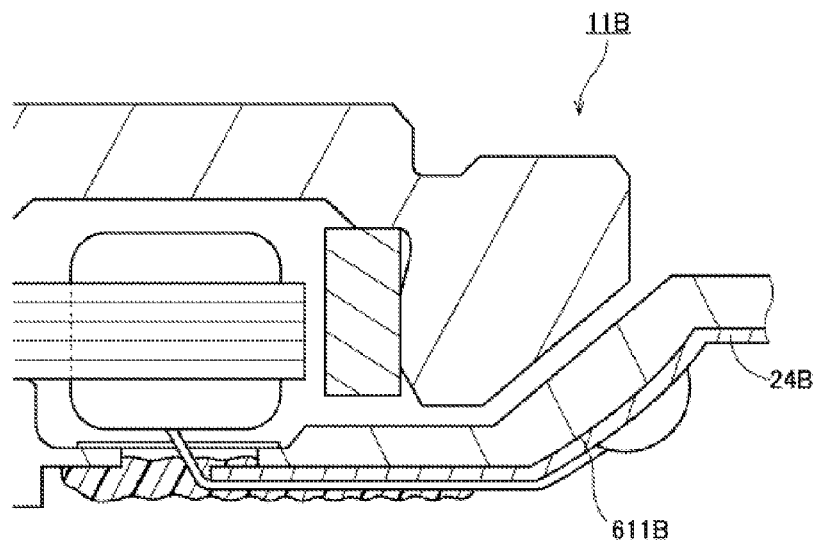
FIG. 10 is a partial vertical-sectional view of a spindle motor according to a modified example of a preferred embodiment of the present invention.

FIG. 10 is a partial vertical-sectional view of a spindle motor 11B according to a first modified example of a preferred embodiment of the present invention. While the respective slant surfaces preferably are planar surfaces in the aforementioned preferred embodiments, the slant surface 611B is preferably a curved surface in the example shown in FIG. 10. It is preferred that the slant surface 611B be rectilinear in an arbitrary cross-section orthogonal to the center axis. In this case, it is possible to prevent the circuit substrate 24B from being distorted in the circumferential direction when the circuit substrate 24B is arranged along the slant surface 611B. This makes it easy to arrange the circuit substrate 24B on the slant surface 611B. On an arbitrary cross-section orthogonal to the center axis, the slant surface 611B may be arranged into a curvilinear shape to have a curvature smaller than the curvature of the remaining region of the lower slant surface. In this case, as compared with a case where the circuit substrate 24B is arranged on the remaining region of the lower slant surface, it is possible to prevent the circuit substrate 24B from being distorted in the circumferential direction when the circuit substrate 24B is arranged on the slant surface 611B.

Figure 11:
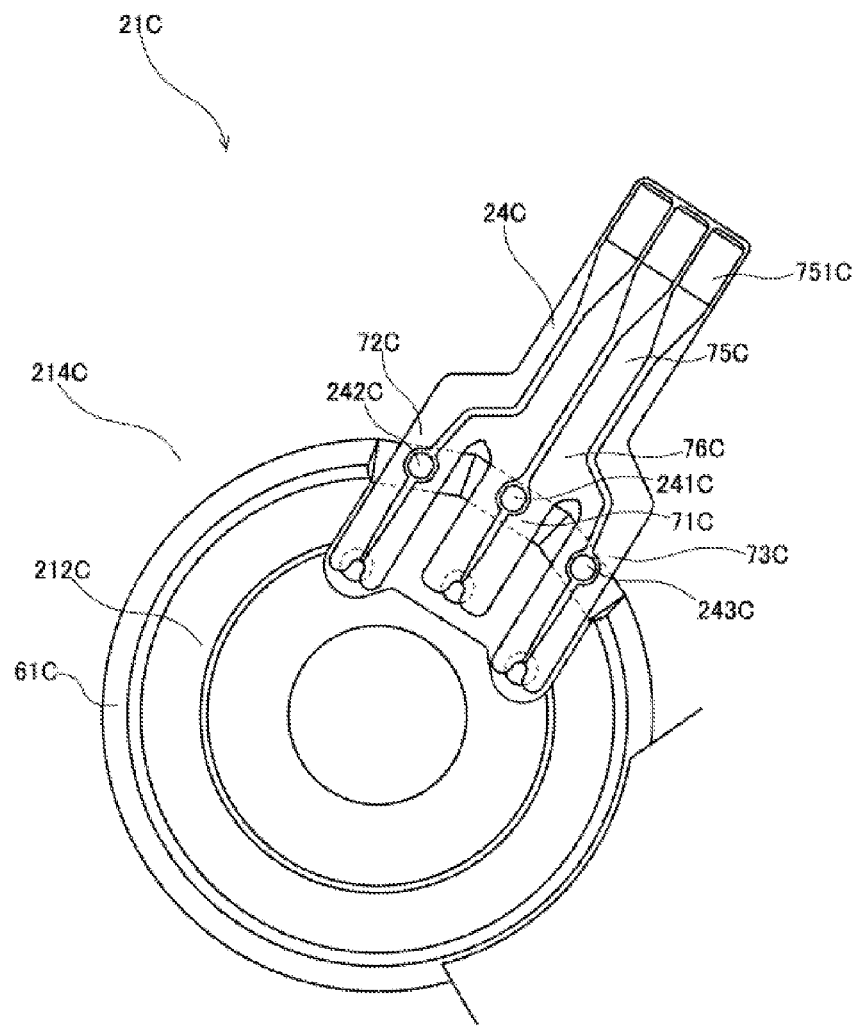
FIG. 11 is a partial bottom view of a base member and a circuit substrate according to a modified example of a preferred embodiment of the present invention.

FIG. 11 is a partial bottom view of a base member 21C and a circuit substrate 24C according to a second modified example of a preferred embodiment of the present invention. In the example shown in FIG. 11, the circuit substrate 24C preferably includes an outer connecting portion 76C arranged to interconnect the radial outer end portions of a first substrate piece 71C, a second substrate piece 72C, and a third substrate piece 73C. The circuit substrate 24C preferably further includes an outer substrate portion 75C extending radially outward from the outer connecting portion 76C. Electrodes 751C electrically connected to land portions 241C, 242C, and 243C are preferably arranged in the outer substrate portion 75C. The radial inner end side of the outer connecting portion 76C is arranged in the outer bottom portion 214C arranged radially outward of the lower slant surface 61C. The substrate pieces 71C, 72C, and 73C are not connected to one another at the radial inner side. Therefore, when the respective substrate pieces 71C, 72C, and 73C are arranged along the lower slant surface 61C, it is preferably possible to significantly reduce and prevent generation of circumferential distortion of the circuit substrate 24C in a border between the inner bottom portion 212C and the lower slant surface 61C and in a border between the lower slant surface 61C and the outer bottom portion 214C.

Figure 12:
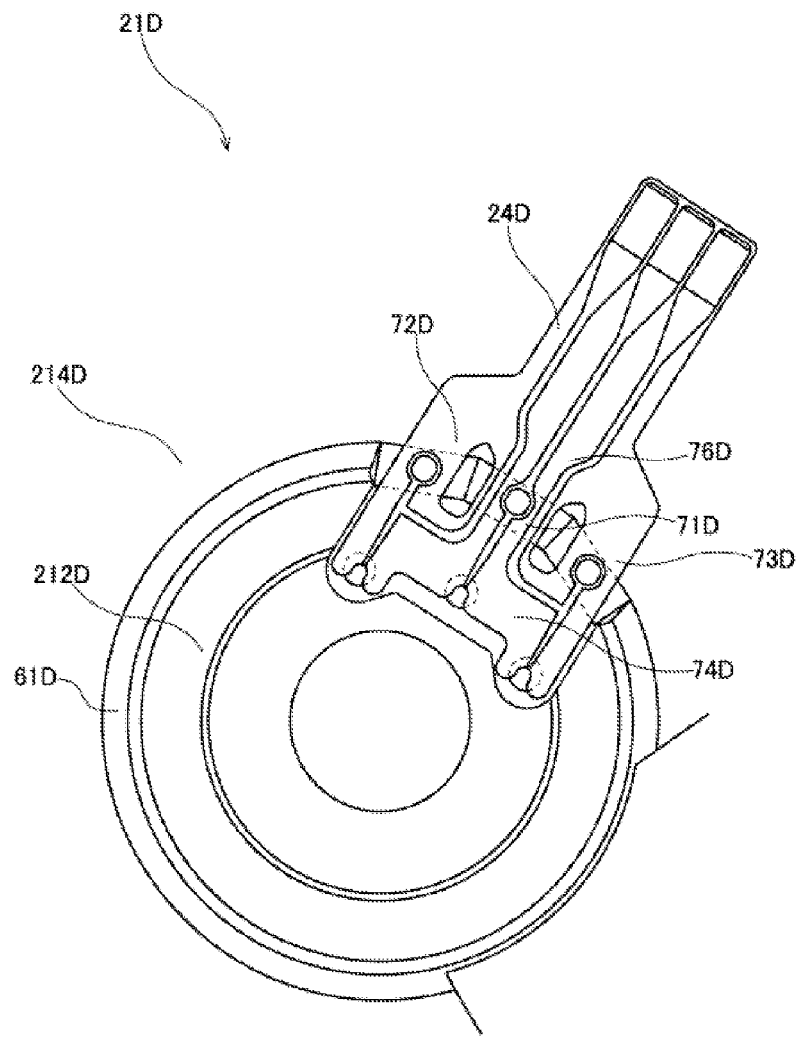
FIG. 12 is a partial bottom view of a base member and a circuit substrate according to a modified example of a preferred embodiment of the present invention.

FIG. 12 is a partial bottom view of a base member 21D and a circuit substrate 24D according to a third modified example of a preferred embodiment of the present invention. In the example shown in FIG. 12, the circuit substrate 24D preferably includes an inner connecting portion 74D arranged to interconnect the radial inner end portions of a first substrate piece 71D, a second substrate piece 72D, and a third substrate piece 73D. The circuit substrate 24D preferably further includes an outer connecting portion 76D arranged to interconnect the radial outer end portions of the first substrate piece 71D, the second substrate piece 72D, and the third substrate piece 73D. The radial outer end side of the inner connecting portion 74D is preferably arranged in the inner bottom portion 212D. The radial inner end side of the outer connecting portion 76D is preferably arranged in the outer bottom portion 214D arranged radially outward of the lower slant surface 61D. The substrate pieces 71D, 72D, and 73D are not circumferentially connected to one another in a border between the inner bottom portion 212D and the lower slant surface 61D and in a border between the lower slant surface 61D and the outer bottom portion 214D. Therefore, when the substrate pieces 71D, 72D, and 73D are arranged along the lower slant surface 61D, it is possible to significantly reduce and prevent generation of circumferential distortion of the circuit substrate 24D in the border between the inner bottom portion 212D and the lower slant surface 61D and in the border between the lower slant surface 61D and the outer bottom portion 214D.

Figure 13:
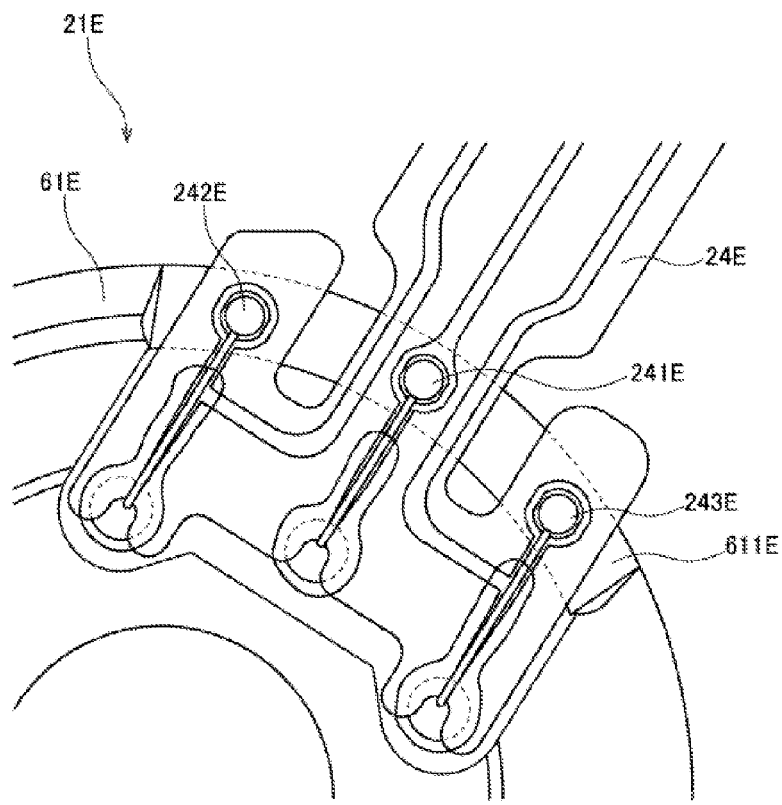
FIG. 13 is a partial bottom view of a base member and a circuit substrate according to a modified example of a preferred embodiment of the present invention.

FIG. 13 is a partial bottom view of a base member 21E and a circuit substrate 24E according to a fourth modified example of a preferred embodiment of the present invention. In the example shown in FIG. 13, a slant surface 611E is preferably provided to continuously extend on a lower slant surface 61E. In FIG. 13, a plurality of land portions 241E, 242E, and 243E is arranged on a single slant surface. On the slant surface 611E, straight lines extending along the inclination directions of the regions in which the adjoining land portions are arranged extend away from each other in the circumferential direction as the straight lines extend radially outward. In this case, as compared with a case where the inclination directions of the regions in which the adjoining land portions are arranged are identical with each other, it becomes possible to prevent solder portions from contacting each other.

Figure 14:
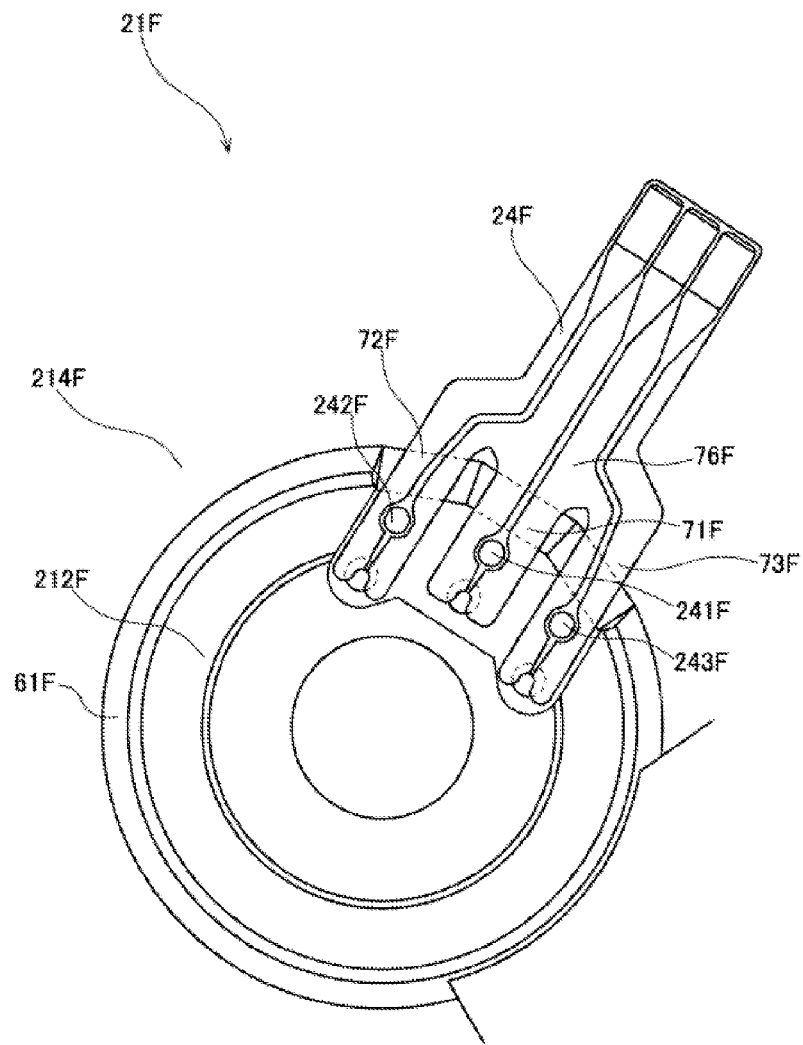
FIG. 14 is a partial bottom view of a base member and a circuit substrate according to a modified example of a preferred embodiment of the present invention.

FIG. 14 is a partial bottom view of a base member 21F and a circuit substrate 24F according to a fifth modified example of a preferred embodiment of the present invention. In the example shown in FIG. 14, the circuit substrate 24F preferably includes an outer connecting portion 76F arranged to interconnect the radial outer end portions of a first substrate piece 71F, a second substrate piece 72F, and a third substrate piece 73F. The radial inner end side of the outer connecting portion 76F is preferably arranged in the outer bottom portion 214F arranged radially outward of the lower slant surface 61F. The substrate pieces 71F, 72F, and 73F are not connected to one another at the radial inner side. The land portions 241F, 242F, and 243F are arranged in the inner bottom portion 212F of the base member 21F. In this case, when the circuit substrate 24F is arranged on the lower surface of the base member 21F, it is possible to prevent the circuit substrate 24F from being distorted in the circumferential direction. It is also possible to reduce the lead-out length of lead wires by arranging the land portions 241F, 242F, and 243F in the inner bottom portion 212F.

Figure 15:
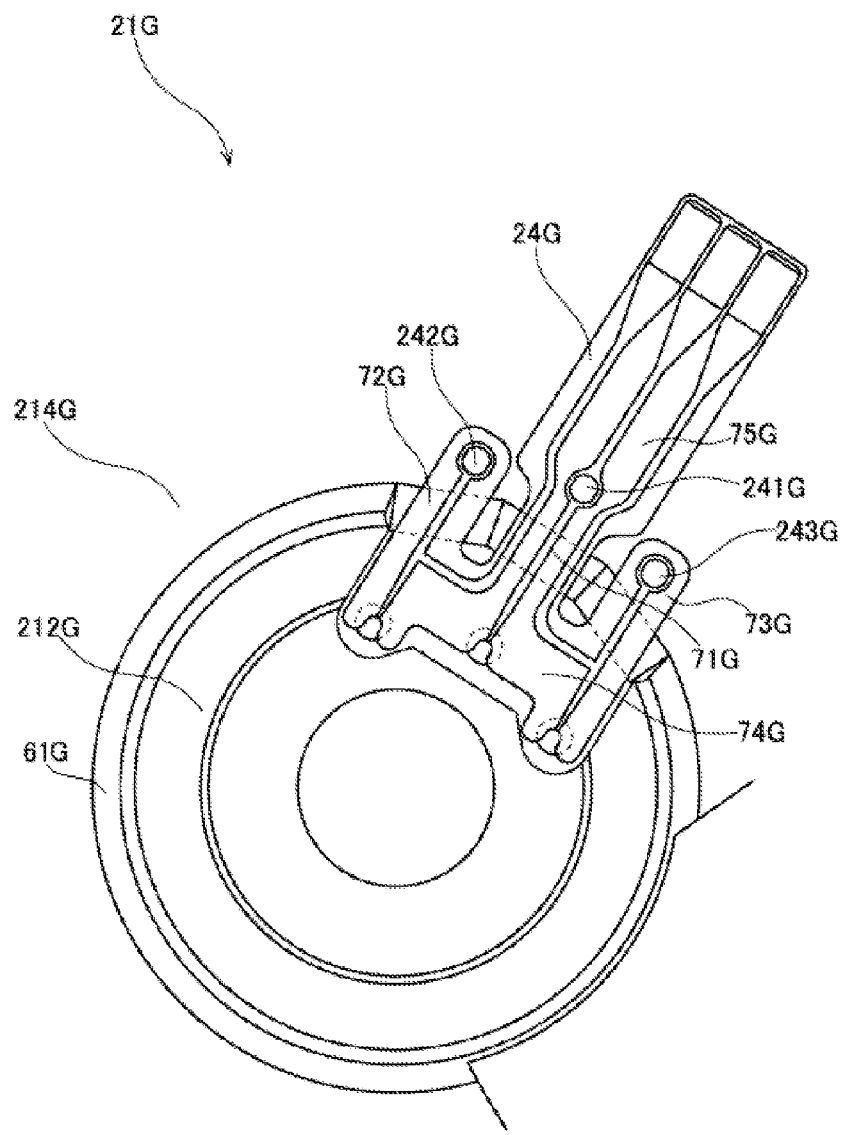
FIG. 15 is a partial bottom view of a base member and a circuit substrate according to a modified example of a preferred embodiment of the present invention.

FIG. 15 is a partial bottom view of a base member 21G and a circuit substrate 24G according to a sixth modified example of a preferred embodiment of the present invention. In the example shown in FIG. 15, the circuit substrate 24G preferably includes an inner connecting portion 74G arranged to interconnect the radial inner end portions of a first substrate piece 71G, a second substrate piece 72G, and a third substrate piece 73G. The radial outer end side of the inner connecting portion 74G is arranged in the inner bottom portion 212G. The circuit substrate 24G preferably further includes an outer substrate portion 75G extending radially outward from the first substrate piece 71G. The land portions 241G, 242G, and 243G are arranged in the outer bottom portion 214G of the base member 21G. In this case, it is possible to prevent the circuit substrate 24G from being distorted when the circuit substrate 24G is arranged on the lower surface of the base member 21G. In addition, the axial dimension of the spindle motor can be further reduced by arranging the land portions 241G, 242G, and 243G radially outward of the lower slant surface 61G.

Figure 16:
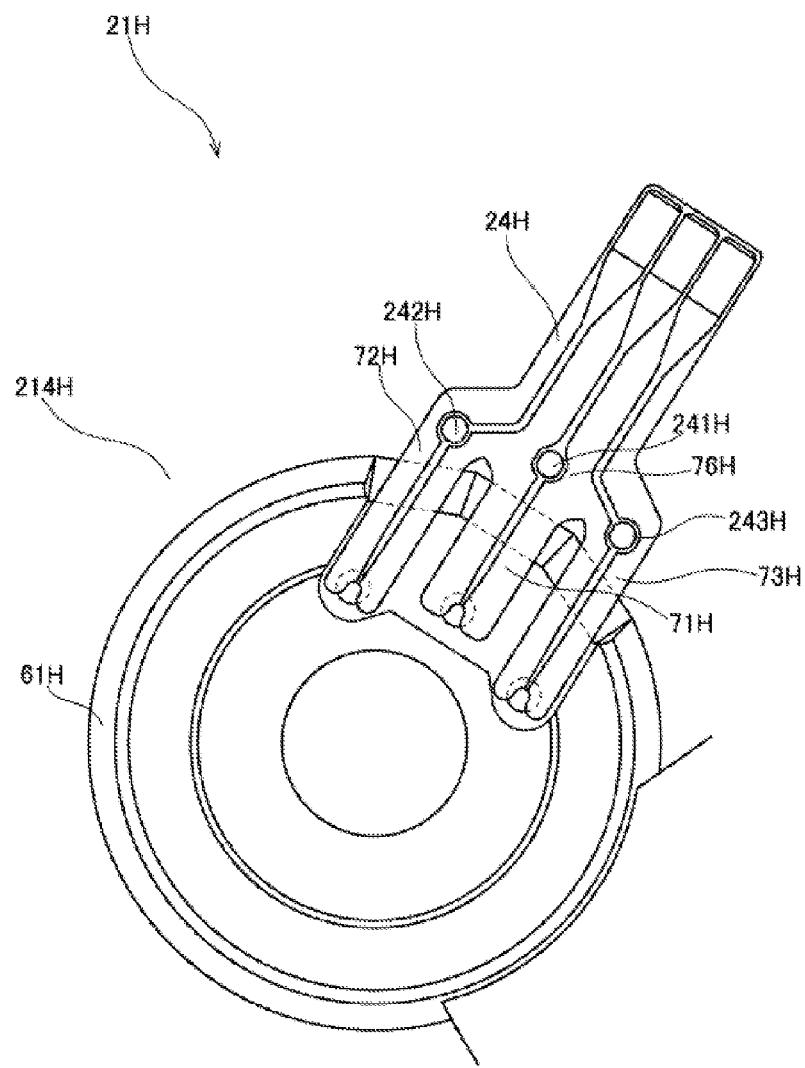
FIG. 16 is a partial bottom view of a base member and a circuit substrate according to a modified example of a preferred embodiment of the present invention.

FIG. 16 is a partial bottom view of a base member 21H and a circuit substrate 24H according to a seventh modified example of a preferred embodiment of the present invention. In the example shown in FIG. 16, the circuit substrate 24H preferably includes an outer connecting portion 76H arranged to interconnect the radial outer end portions of a first substrate piece 71H, a second substrate piece 72H, and a third substrate piece 73H. The radial inner end side of the outer connecting portion 76H is arranged in the outer bottom portion 214H arranged radially outward of the lower slant surface 61H. The land portions 241H, 242H, and 243H are arranged in the outer bottom portion 214H of the base member 21H. In this case, it is possible to prevent the circuit substrate 24H from being distorted when the circuit substrate 24H is arranged on the lower surface of the base member 21H.

In case where a plurality of slant surfaces is provided, the circumferential widths of the slant surfaces may not be equal to one another. For example, the circumferential width of the first slant surface may be larger than the circumferential widths of the second slant surface and the other slant surfaces. Similarly, when a plurality of first copper foils is arranged in the first substrate piece, the circumferential width of the first substrate piece may be larger than that of each of the other substrate pieces. In addition, for example, the circumferential width of the substrate piece in which a plurality of land portions is arranged may be larger than that of the substrate piece in which another land portion is arranged. In this manner, the circumferential width of each of the substrate pieces of the circuit substrate and the circumferential width of each of the slant surfaces may be appropriately changed depending on the patterns of the land portions and the copper foils arranged in the circuit substrate.

While all the first slant surface 611, the second slant surface 612, and the third slant surface 613 are preferably formed by, for example, press working, only some of the first, second, and third slant surfaces 611, 612, and 613 may be formed by press working. For example, the first slant surface may be formed by press working and the second and the third slant surfaces may be formed by cutting.

The specific shapes of the respective components may differ from those shown in the respective figures of the drawings. Features of the above-described preferred embodiments and the modifications thereof may be combined appropriately as long as no conflict arises.

The preferred embodiments of the present invention and modifications thereof can find application in a spindle motor and a disk drive apparatus.

While preferred embodiments of the present invention and modifications thereof have been described above, it is to be understood that variations and further modifications will be apparent to those skilled in the art without departing from the scope and spirit of the present invention. The scope of the present invention, therefore, is to be determined solely by the following claims.

What is claimed is:

1. A spindle motor, comprising:
a stationary unit; and
a rotary unit supported to rotate about a center axis extending up-and-down; wherein
the stationary unit includes a base member, an armature positioned above the base member, and a circuit substrate arranged on a lower surface of the base member and electrically connected to coils of the armature;
the rotary unit includes a magnet arranged to generate torque between the magnet and the armature;
the base member includes an annular or substantially annular bottom portion positioned below the armature, base through-holes axially extending through the bottom portion, and a lower slant surface extending radially outward and upward from an outer peripheral portion of a lower surface of the bottom portion;
the circuit substrate includes a plurality of land portions arranged on a lower surface of the circuit substrate;

a plurality of lead wires extending from the coils is led out toward the lower surface of the circuit substrate through the base through-holes and is fixed to the land portions;

the lower slant surface includes a first slant surface and a second slant surface arranged along a circumferential direction;

at least one of the land portions is arranged on each of the first slant surface and the second slant surface, and a first straight line extending along an inclination direction of the first slant surface and a second straight line extending along an inclination direction of the second slant surface extend away from each other in the circumferential direction as the first straight line and the second straight line extend radially outward.

2. The spindle motor of claim 1, wherein at least one of the first slant surface and the second slant surface is rectilinear on an arbitrary cross-section orthogonal or substantially orthogonal to the center axis.

3. The spindle motor of claim 2, wherein an upper surface of the base member includes an upper-surface bulging portion extending parallel or substantially parallel to at least one of the first slant surface and the second slant surface, the upper-surface bulging portion being rectilinear on the arbitrary cross-section orthogonal or substantially orthogonal to the center axis.

4. The spindle motor of claim 1, wherein each of the first slant surface and the second slant surface is a planar surface or a curved surface.

5. The spindle motor of claim 1, wherein a lower-surface bulging portion having a convex shape is provided in a border between the first slant surface and the second slant surface.

6. The spindle motor of claim 5, wherein one of the land portions is arranged on each of the first slant surface and the second slant surface.

7. The spindle motor of claim 1, wherein a circumferential width of the first slant surface is larger than a circumferential width of the second slant surface.

8. The spindle motor of claim 1, wherein the first slant surface and the second slant surface are positioned above a portion of the lower slant surface other than the first slant surface and the second slant surface, and an upper-surface bulging portion protruding beyond its periphery is provided on the upper surface of the base member in a position corresponding to each of the first slant surface and the second slant surface.

9. The spindle motor of claim 8, wherein, on the upper surface of the base member in a position corresponding to the lower slant surface, a gap between the upper-surface bulging portion and the rotary unit is smaller than a gap between a portion of the upper surface of the base member other than the upper-surface bulging portion and the rotary unit.

10. The spindle motor of claim 1, wherein the circuit substrate includes a plurality of substrate pieces arranged along the circumferential direction with a gap left therebetween, each of the land portions arranged in each of the substrate pieces.

11. The spindle motor of claim 10, wherein the circuit substrate further includes an inner connecting portion arranged to interconnect radial inner end portions of the substrate pieces and an outer substrate portion extending radially outward from one of the substrate pieces.

12. The spindle motor of claim 11, wherein the circuit substrate further includes a plurality of first copper foils extending from the outer substrate portion to the land portions via the one of the substrate pieces.

13. The spindle motor of claim 1, wherein the circuit substrate includes tip edge portions overlapping with the base through-holes, and the lead wires extending from the coils contact the tip edge portions.

14. The spindle motor of claim 13, wherein the circuit substrate further includes copper foils extending from the land portions to the tip edge portions of the circuit substrate, the lead wires extending along the copper foils.

15. The spindle motor of claim 14, wherein the base through-holes axially overlap with radial inner end portions of the copper foils.

16. The spindle motor of claim 1, wherein each of the land portions has an elliptical or substantially elliptical shape when seen from below and major axes of the land portions are arranged parallel or substantially parallel to one another.

17. The spindle motor of claim 1, wherein the lead wires extend parallel or substantially parallel to one another between lower end portions of the base through-holes and the land portions.

18. The spindle motor of claim 1, wherein the lead wires extend in a radial or substantially radial pattern from lower end portions of the base through-holes to the land portions.

19. A disk drive apparatus, comprising:
the spindle motor of claim 1;
an access unit arranged to perform at least one of information reading and writing tasks with respect to a disk supported on the rotary unit of the spindle motor; and
a cover; wherein
the rotary unit and the access unit are accommodated within a housing including the base member and the cover.

* * * * *